No. 801,671. PATENTED OCT. 10, 1905.
A. MONFORTS.
PAPER STRIP FOR MARKING MACHINES.
APPLICATION FILED AUG. 8, 1902.

2 SHEETS—SHEET 1.

No. 801,671. PATENTED OCT. 10, 1905.
A. MONFORTS.
PAPER STRIP FOR MARKING MACHINES.
APPLICATION FILED AUG. 8, 1902.

UNITED STATES PATENT OFFICE.

AUGUST MONFORTS, OF MUNCHEN-GLADBACH, GERMANY.

PAPER STRIP FOR MARKING-MACHINES.

No. 801,671.　　　Specification of Letters Patent.　　　Patented Oct. 10, 1905.

Application filed August 8, 1902. Serial No. 118,913.

*To all whom it may concern:*

Be it known that I, AUGUST MONFORTS, a subject of the German Emperor, residing at Munchen-Gladbach, Germany, have invented certain new and useful Improvements in a Paper Strip for Marking-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to indicating-strips to be used in measuring and marking machines, and more especially to that class of machines which measure a continuous web and mark the measure at determined points on the web by pasting on it numbered pieces cut from said strip, and has for its object means for determining the measure from the wrong side of the strip and also for determining the end of a series of measures on that strip without withdrawing the strip to too great an extent from the machine.

In machines which cut off the end of the gummed paper strip, whose gummed side, which is the only side visible to the attendant, as it is turned outward and pasted on the selvage of the fabric being measured, the attendant was not able to determine from the end of the strip fed out and being measured how nearly the series of numbers had been exhausted. Furthermore, goods being measured do not always measure the full series of numbers on the strip, and it is desirable to indicate also on the back of the strip where this series ends, so that the attendant can pull out the strip containing the remainder of the series of numbers, so as to tear it off preparatory to beginning the marking of a new piece of goods.

The object of this invention is to avoid this disadvantage and provide a number or label strip that will enable the ready inspection of the strip from the back, and thereby determine the point at which the remainder of an incomplete series of numbers is to be torn off and to facilitate the inspection of the numbers.

Figure 3:
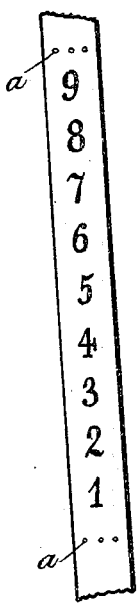
Figure 3A:
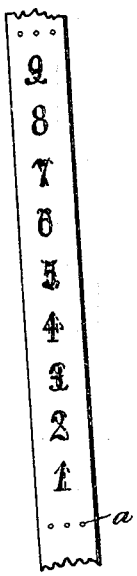
Figure 4:
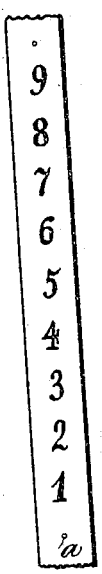
Figure 4A:
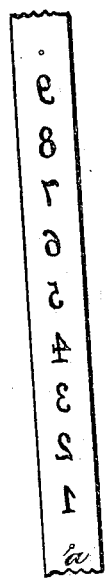

Referring to the drawings, in which like parts are similarly designated, Figure 1 shows the strip in which the numbers are placed parallel to its edge in series and the end of each series indicated. Fig. 2 shows a similar strip with numbers placed at right angles to the edge and the end of each series indicated in a different manner. Fig. 3 shows the front, and Fig. 3ª the reverse, of a strip of paper on which the numbers register on both sides; and Fig. 4 the front, and Fig. 4ª the reverse, of a strip of transparent paper having the numbers thereon.

Referring to Fig. 1, let it be supposed that the goods to be measured and marked are at the greatest fifty meters long and the beginning of each series of fifty on the strip is indicated by perforations $a$. At the beginning of each series of numbers on the back of each strip may be placed a similar series of numbers registering with those on the front and visible through the gummed surface thereon, whereby the attendant can tell by inspection the number of meters of goods already measured. The end of each series of numbers may, as shown in Fig. 2, be indicated by a dotted line $c$ on the back of the strip or any suitable device or sign or a single perforation. In place of indicating on the back of the strip a second series of numbers registering with those on the front, Figs. 3 and 3ª, the strip may be transparent and the numbers visible through the back and the gummed surface thereon, Figs. 4 and 4ª.

Having thus described my invention, what I claim as new therein, and desire to secure by Letters Patent, is—

1. A paper strip for marking-machines from which pieces are to be severed and affixed to an article, having series of indices on one side and means whereby the ends of each series can be determined on the reverse of said strip, substantially as described.

2. A paper strip for marking-machines, from which pieces are to be severed and affixed to an article provided on one side with series of indices, and perforations at the end of each series to determine the beginning of the next series thereon, substantially as described.

3. A paper strip for marking-machines from which numbered pieces are to be severed and affixed to the article having series of numbers on one side and an index at the beginning of each series on the other side, substantially as described.

In testimony that I claim the foregoing as my invention I have signed my name in presence of two subscribing witnesses.

AUGUST MONFORTS.

Witnesses:
　JOSEF EWERHARD,
　WILLIAM ESSENWEIN.